Nov. 27, 1962 J. F. SCHNEIDER ETAL 3,066,177
THERMOCOUPLE
Filed Feb. 25, 1960 3 Sheets-Sheet 1

INVENTORS
JULIUS F SCHNEIDER
DANTE J ACCINNO
BY Karl Huber
James E. Bryan
Alan C. Rote
ATTORNEYS

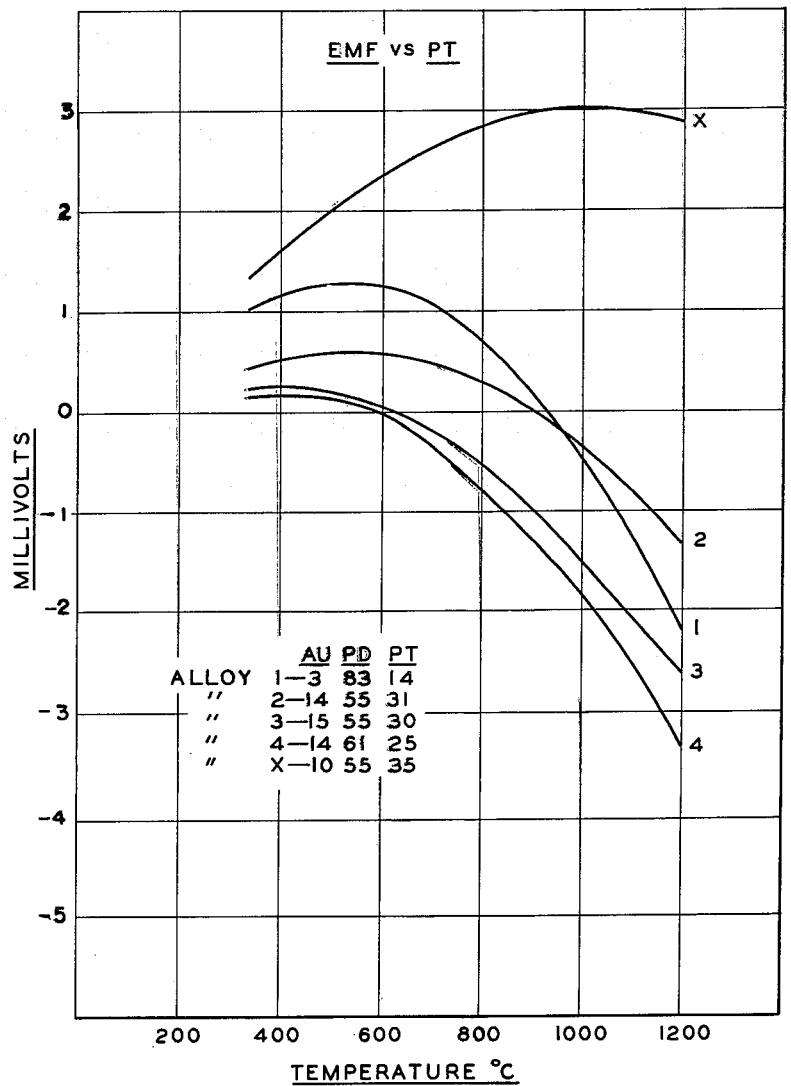

United States Patent Office 3,066,177
Patented Nov. 27, 1962

3,066,177
THERMOCOUPLE
Julius F. Schneider, Irvington, and Dante J. Accinno, Jersey City, N.J., assignors, by mesne assignments, to Engelhard Industries, Inc., Newark, N.J., a corporation of Delaware
Filed Feb. 25, 1960, Ser. No. 10,975
7 Claims. (Cl. 136—5)

The present invention deals with thermocouples, and also to circuits employing thermocouples of different types.

Among the known thermocouples used for high temperature applications there is the Chromel-Alumel thermocouple having a positive leg composed of 90 percent nickel–10 percent chromium and a negative leg composed of 94 percent nickel–3 percent manganese–2 percent aluminum–1 percent silicon. The Chromel-Alumel thermocouple is used extensively because of its substantially high E.M.F. output at a given temperature within a certain temperature range, for example, between about 400° C. and 1200° C. While the Chromel-Alumel thermocouple is satisfactory for use under temperature conditions up to about 1100° C., it is subject to junction deterioration at higher temperatures, for example, between about 1100° C. and 1200° C. and to complete failure at temperatures of 1200° C. and higher after about 50 hours of operation. Furthermore, the Chromel-Alumel thermocouple no longer maintains a substantially constant E.M.F. output at 1100° C. after about 48 hours of operation and thereafter continues to progressively drop in E.M.F. output.

It is an object of the present invention to provide a precious metal thermocouple having the desirable properties of the Chromel-Alumel thermocouple at temperatures between about 400° C. and 1000° C. and which is superior to the Chromel-Alumel thermocouple at temperatures above about 1000° C.

It is another object of the invention to provide a thermocouple which operates reliably at elevated temperatures.

It is a further object of the present invention to provide a thermocouple which provides a substantially constant high E.M.F. output even after 2000 hours and more of use at temperatures of about 1200° C.

Another object of the invention is to reduce the cost of high temperature sensing systems by using inexpensive thermocouples at lower temperature sensing points.

Other objects and advantages of the invention will become apparent from the description hereinafter following and the drawings forming a part hereof, in which:

FIGURE 3 is a graphic representation of the behavior of positive thermocouple legs composed of alloys of the invention taken against platinum as a negative thermocouple leg.

In accordance with one aspect of the present invention, to be discussed below, an inexpensive thermocouple having a predetermined E.M.F. versus temperature characteristic and a relatively low melting point is located on a cooler portion of a structure; another thermocouple having a closely related E.M.F. versus temperature characteristic and a higher melting point is secured to a hotter portion of the structure; and the two thermocouples are connected by a sampling circuit to a common output circuit.

From another standpoint, the present invention deals with a thermocouple having both positive and negative thermoelectric components composed of precious metal alloys of a critical composition range which is essential for substantially high E.M.F. output comparable with the known Chromel-Alumel thermocouple at temperatures between about 400° C. and 1000° C. and which is superior to the Chromel-Alumel thermocouple in the maintenance of mechanical strength and constant high E.M.F. output at temperatures above 1000° C. and especially at temperatures of 1200° C. and higher.

The thermocouple of the invention comprises a positive thermoelectric component or leg composed of an alloy comprising essentially 55%–83% palladium, 14%–34% platinum, and 3%–15% gold. The negative thermoelectric component or leg is composed of an alloy comprising essentially 60%–65% gold and 35%–40% palladium. Less than one percent platinum may be present in the negative leg without deleteriously affecting the thermocouple characteristics hereinafter more particularly described.

Figure 1:
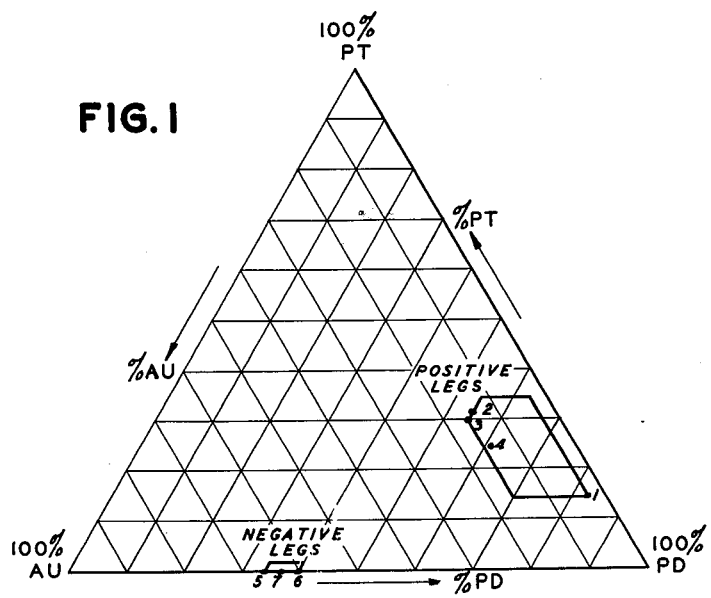
FIGURE 1 is a graphic representation of the critical composition range of thermocouple alloys according to this invention.

FIGURE 1 is a triangular co-ordinate representation of the critical range of alloys according to the invention and including identification of preferred alloys for the positive and negative legs of the thermocouples. The preferred alloys are numerically identified as follows:

Alloy 1—3% gold, 83% palladium, 14% platinum
Alloy 2—14% gold, 55% palladium, 31% platinum
Alloy 3—15% gold 55% palladium, 30% platinum
Alloy 4—14% gold, 61% palladium, 25% platinum
Alloy 5—65% gold, 35% palladium
Alloy 6—60% gold, 40% palladium
Alloy 7—63.5% gold, 36.5% palladium The alloys 1 through 4 are the positive thermoelectric component alloys and the alloys 5 through 7 are the negative thermoelectric component alloys.

Examples of thermocouples according to the invention are provided by joining the ends of wires composed of the above-mentioned alloys as follows:

Alloy 1 vs. alloy 5
Alloy 2 vs. alloy 5
Alloy 3 vs. alloy 7
Alloy 4 vs. alloy 6

Figure 2:
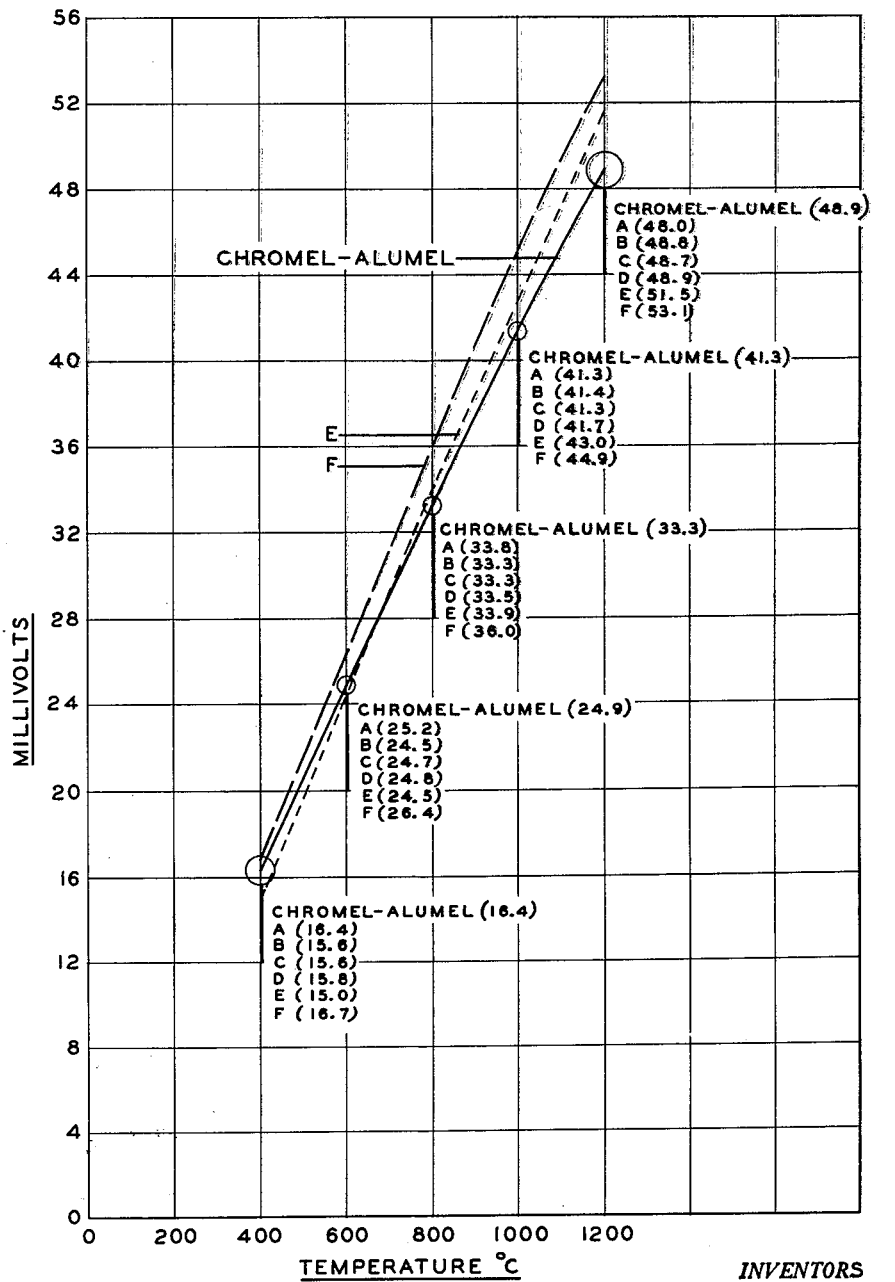
FIGURE 2 is a graphic representation of the behavior of conventional thermocouples and thermocouples of the present invention in comparison with the Chromel-Alumel thermocouple.

FIGURE 2 is a graphic representation showing an example of the behavior of conventional thermocouples and thermocouples of this invention in comparison with a Chromel-Alumel thermocouple, which behavior is tabulated below as to E.M.F. output in millivolts with temperature and millivolt deviation from the output of the Chromel-Alumel thermocouple.

Table I

| Thermocouple | Alloy | 400° C., mv. | 600° C., mv. | 800° C., mv. | 1,000° C., mv. | 1,200° C., mv. |
| --- | --- | --- | --- | --- | --- | --- |
| Chromel-Alumel | 90Ni—10Cr vs. 94Ni—3Mn—2Al—1Si | 16.4 | 24.9 | 33.3 | 41.3 | 48.9 |
| A | Alloy 1 vs. Alloy 5 | 16.4 | 25.2 | 33.8 | 41.3 | 48.0 |
|   | Deviation | 0.0 | +0.3 | +0.5 | 0.0 | −0.9 |
| B | Alloy 2 vs. Alloy 5 | 15.6 | 24.5 | 33.3 | 41.4 | 48.8 |
|   | Deviation | −0.8 | −0.4 | 0.0 | +0.1 | −0.1 |
| C | Alloy 3 vs. Alloy 7 | 15.6 | 24.7 | 33.3 | 41.3 | 48.7 |
|   | Deviation | −0.8 | −0.2 | 0.0 | 0.0 | −0.2 |
| D | Alloy 4 vs. Alloy 6 | 15.8 | 24.8 | 33.5 | 41.7 | 48.9 |
|   | Deviation | −0.6 | −0.1 | +0.2 | +0.4 | 0.0 |
| E | 10Au—55Pd—35Pt vs. 60Au—35Pd—5Pt | 15.0 | 24.5 | 33.9 | 43.0 | 51.5 |
|   | Deviation | −1.4 | −0.4 | +0.6 | +1.7 | +2.6 |
| F | 10Au—55Pd—35Pt vs. 65Au—35Pd | 16.7 | 26.4 | 36.0 | 44.9 | 53.1 |
|   | Deviation | +0.3 | +1.5 | +2.7 | +3.6 | +4.2 |

The illustration of FIGURE 2 and the above table I indicate that the alloys of the invention closely approximate the straight line relationship of high E.M.F. output with temperature of the Chromel-Alumel thermocouple and as such these new alloys are capable of calibration by the use of a temperature indicator calibrated for the Chromel-Alumel thermocouple. It will be noted that FIGURE 2 shows a series of spaced circles drawn on the Chromel-Alumel line. These circles are located at the 400° C., 600° C., 800° C., 1000° C., and 1200° C. temperature lines and each define an area within which is located the E.M.F. output points of the thermocouples of the invention, i.e. thermocouples A, B, C and D. In each case the thermocouples of the invention have a millivolt output which either matches the output of the Chromel-Alumel thermocouple or deviates therefrom less than one millivolt and as such are capable of calibration and measurement by the use of a temperature indicator calibrated for the Chromel-Alumel thermocouple. On the other hand, it will be noted that thermocouples E and F, which represent conventional thermocouples, deviate considerably from the Chromel-Alumel thermocouple at temperatures above 800° C. and especially at temperatures from about 1000° C. and higher.

As stated above, the thermocouples of this invention, while comparable with the high E.M.F. output of the Chromel-Alumel thermocouple, are far superior as to length of useful life in maintaining a constant high E.M.F. output at temperatures which are deleterious to the Chromel-Alumel thermocouple.

Table II below shows that even at a temperature of 1200° C. a thermocouple of the present invention still maintains a constant high E.M.F. output long after the Chromel-Alumel thermocouple has ceased to function satisfactorily under lower temperature, i.e. about 1100° C.

Table II

| Hours | Cr-Al, mv. | Temp., ° C.[1] | Alloy 1 vs. Alloy 5, mv. | Temp., ° C.[1] |
| --- | --- | --- | --- | --- |
| 80 | 39.70 | 970.4 | 40.75 | 974.8 |
| 360 | 39.70 | 987.8 | 40.80 | 983.5 |
| 408 | 43.75 | 1,089.0 | 44.50 | 1,092.3 |
| 480 | 41.50 | 1,088.1 | 44.80 | 1,096.5 |
| 528 | 28.05 | 1,081.3 | 44.07 | 1,077.9 |
| 650 | Break | 1,088.0 | 44.75 | 1,093.1 |
| 1,658 |   |   | 48.22 | 1,200.4 |
| 2,650 |   |   | 48.09 | 1,200.0 |

[1] As determined by a Pt vs. Pt-Rh thermocouple.

Table II shows that the Chromel-Alumel couple indicated a considerable drift between 480 and 528 hours at about 1100° C.

The Chromel-Alumel couple failed completely after 650 hours at about 1100° C. In contrast, thermocouple alloy 1 vs. alloy 5 according to this invention not only showed a negligible drift at about 1100° C. but continued on through 650 hours plus 2000 hours at 1200° C. and upon recalibration showed a maximum drift of only 0.07 mv. (1.75 deg.) at 1200 deg. C.

It has now been discovered that in the palladium-platinum-gold alloy series there is a very limited range of positive thermocouple leg alloys, which when taken against platinum as a negative leg, exhibit a certain E.M.F. relationship with rising temperatures. Such alloys produce an increasingly positive E.M.F. as lower temperatures are increased, and exhibit a maximum at about 400° C. to 600° C. At higher temperatures the E.M.F. decreases continuously and reaches negative values between about 600° C. and 1000° C. This is illustrated by FIGURE 3 which shows the characteristics of alloys 1, 2, 3 and 4 of the invention. According to the invention, it has been found that these alloys when taken as the positive thermocouple element against a negative thermocouple element taken from a narrow range of gold-palladium alloys, i.e. 60–65Au–35–40Pd, the E.M.F. output of the thermocouple substantially matches the output of the Chromel-Alumel thermocouple with deviations of less than 1 millivolt or with no deviation at certain temperatures. It will be noted in FIGURE 2 that such thermocouples are identified as thermocouples A, B, C and D. Thermocouple A as indicated has no deviation at 400° C. Thermocouple D as indicated has substantially no deviation at 600° C. Thermocouples B and C as indicated have no deviation at 800° C. Thermocouples A and C as indicated have no deviation at 1000° C. and thermocouple D as indicated has no deviation at 1200° C.

In addition to alloys of the invention, FIGURE 3 illustrates the characteristics of a conventional alloy X which does not follow the E.M.F. temperature relationship of the alloys of the invention. The conventional alloy 10Au–55Pd–35Pt differs in composition from alloy 3 only in that 5 percent of the gold has been substituted by an additional 5 percent of platinum resulting in an entirely different characteristic which renders it unmatchable with Chromel-Alumel even when taken with a negative leg of the composition of this invention. This is particularly illustrated by thermocouple F of FIGURE 2 having the composition as shown in Table I.

In accordance with the invention, the thermocouples contemplated have a positive thermoelectric element joined to a negative thermoelectric element, the elements having metal compositions proportioned to substantially match the E.M.F. vs. temperature characteristics of a Chromel-Alumel thermocouple, wherein the proportioned positive element consists of 3%–15% gold, 55%–83% palladium, 14%–34% platinum, and the proportioned negative element consists of 60%–65% gold, 35%–40% palladium.

The alloys of the invention possess high mechanical strength and are advantageously useful especially in oxidizing atmospheres in the measuring of furnace temperatures, especially where controlled temperature are of critical significance, e.g. in the treatment and aging of various alloys, and are especially useful under conditions of high temperatures including either corrosive atmosphere or under conditions where the thermocouple is subject to high velocity gases or air streams which would be deleterious to thermocouples of less mechanical strength and less resistance to corrosion.

While the description sets forth various preferred thermocouple alloys within the specified range, other alloys within the ranges disclosed are contemplated within the scope of the appended claims.

Figure 4:
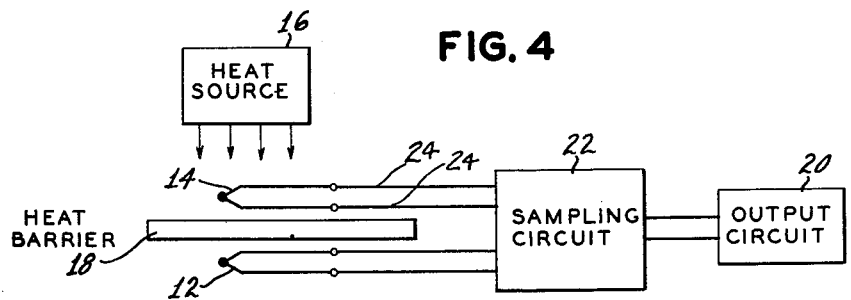
FIGURE 4 is a block circuit diagram of a circuit in accordance with the present invention which employs two different thermocouples.

The circuit diagram of FIGURE 4 represents an apparatus for measuring heat insulation qualities. In FIGURE 4, two thermocouples 12 and 14 of different materials are employed. Heat is applied to the thermocouples 12 and 14 from a heat source 16. A heat barrier 18 to be tested provides a difference in temperature at thermocouple 14 with respect to thermocouple 12. Signals from the two thermocouples 12 and 14 are coupled to a common output circuit 20 by a sampling circuit 22.

In the arrangement shown in FIGURE 4, the thermocouple 14 is at an elevated temperature with respect to the thermocouple 12. The cooler thermocouple 12 may be composed of Chromel-Alumel or another thermocouple having suitable characteristics. In practice, the thermocouple 12 will normally be inexpensive, will have a high E.M.F. output at low temperatures, and will not withstand elevated temperatures. The thermocouple 14 has an E.M.F. versus temperature characteristic which is close to that of thermocouple 12, particularly in the high temperature range. The thermocouple 14 may be within the composition ranges specified hereinabove, and the thermocouple 12 may be a Chromel-Alumel thermocouple. The precious metal thermocouple 14 also has good physical characteristics at high temperatures. Accordingly, it will generally include significant proportions of platinum group metals such as palladium, platinum, rhodium or the like so that high temperature strength characteristics are retained.

Any suitable conventional circuitry may be employed in the implementation of the sampling circuit 22 and the output circuit 20. In its simplest form, the circuit 20 could be a galvanometer, and the sampling circuit 22 could be a simple double-pole, double-throw switch. The double-pole, double-throw switch would serve to alternately connect thermocouples 12 and 14 to the galvanometer output circuit 20. It is also contemplated that the circuitry of FIGURE 4 is applicable to the telemetering of temperature information from supersonic aircraft, missiles, or the like. In such cases, more expensive precious metal thermocouples, such as thermocouple 14 in FIGURE 4, are located on the leading surfaces or the nose of the vehicle, and the base metal thermocouple may be located on the inner or side surfaces of the vehicle where the temperature is lower. For such applications, a large number of thermocouples may be employed, and a multi-channel sampling circuit may be used to transmit the information to the common output circuit. As such sampling circuits are well known in the telemetering and related arts, no detailed circuits are shown in the present application.

The system of FIGURE 4 will have the advantage of using inexpensive thermocouples at lower temperature points. In addition, a single output circuit with a single temperature calibration may be employed in sensing the output of both types of thermocouples.

The lead-in wires 24 connected to the precious metal thermocouple 14 may advantageously be of Chromel and Alumel. By this technique, even if the junctions between the thermocouple 14 and lead-in wires 24 are at moderately elevated temperatures, no undesired voltages will be developed. Furthermore, when a high temperature precious metal thermocouple is substituted for a Chromel-Alumel thermocouple, only the end portion which is subjected to the extremely high temperatures need be replaced; in accordance with this technique, only a small amount of the costly precious metal is required, and the complete Chromel-Alumel structural unit need not be disassembled. It may also be noted that the usual techniques for compensation for the ambient temperature of the cold junction of a Chromel-Alumel thermocouple may be employed without change when the precious metal thermocouple having a generally corresponding characteristic is connected to the Chromel and Alumel leads.

It is to be understood that the above described arrangements are illustrative of the application of the principles of the invention. Numerous other arrangements may be devised by those skilled in the art without departing from the spirit and scope of the invention.

What is claimed is:
1. A thermocouple having a positive thermoelectric element joined to a negative thermoelectric element, the elements having metal compositions proportioned to substantially match the E.M.F. vs. temperature characteristics of a Chromel-Alumel thermocouple, wherein the proportioned positive element consists of 3%–15% gold, 55%–83% palladium, 14%–34% platinum, and the negative element consists of 60%–65% gold, 35%–40% palladium.

2. A thermocouple having a positive thermoelectric element joined to a negative thermoelectric element, the elements having metal compositions proportioned to substantially match the E.M.F. vs. temperature characteristics of a thermocouple having a positive element composed of 90% nickel, 10% chromium, and a negative element composed of 94% nickel, 3% manganese, 2% aluminum, 1% silicon, wherein the proportioned positive element consists of 3%–15% gold, 55%–83% palladium, 14%–34% platinum, and the proportioned negative element consists of 60%–65% gold, 35%–40% palladium.

3. A thermocouple according to claim 1, wherein the proportioned positive element consists of 3% Au–83% Pd–14% Pt and the proportioned negative element consists of 65% Au–35% Pd.

4. A thermocouple according to claim 1, wherein the proportioned positive element consists of 14% Au–55% Pd–31% Pt and the proportioned negative element consists of 65% Au–35% Pd.

5. A thermocouple having a positive thermoelectric element joined to a negative thermoelectric element, the elements having metal compositions proportioned to substantially match the E.M.F. vs. temperature characteristics of a Chromel-Alumel thermocouple, wherein the proportioned positive element consists of 3%–15% gold, 55%–83% palladium, 14%–34% platinum, and the negative element consists of 60%–65% gold, 35%–40% palladium and less than 1% platinum.

6. A thermocouple according to claim 1, wherein the proportioned positive element consists of 14% Au–61% Pd–25% Pt and the proportioned negative element consists of 60% Au–40% Pd.

7. A thermocouple according to claim 1, wherein the proportioned positive element consists of 15% Au–55% Pd–30% Pt and the proportioned negative element consists of 63.5% Au–36.5% Pd.

References Cited in the file of this patent

UNITED STATES PATENTS

| | | |
|---|---|---|
| 1,296,938 | Fahrenwald | Mar. 11, 1919 |
| 1,339,505 | Fahrenwald | May 11, 1920 |
| 1,515,464 | Dietz | Nov. 11, 1924 |
| 1,789,733 | Feuszner | Jan. 20, 1931 |
| 2,015,838 | Borden et al. | Oct. 1, 1935 |
| 2,335,707 | Streicher | Nov. 30, 1943 |
| 2,502,399 | Greeff | Mar. 28, 1950 |
| 2,560,829 | Stewart | July 17, 1951 |